(12) United States Patent
Morris et al.

(10) Patent No.: US 11,451,570 B1
(45) Date of Patent: Sep. 20, 2022

(54) COMPUTER SYSTEM SECURITY SCAN

(71) Applicant: Infocyte, Inc., Austin, TX (US)

(72) Inventors: Ryan Brandt Morris, Benicia, CA (US); Christopher Michael Gerritz, Austin, TX (US)

(73) Assignee: Kaseya Limited, Dublin (IE)

( * ) Notice: Subject to any disclaimer, the term of this patent is extended or adjusted under 35 U.S.C. 154(b) by 439 days.

(21) Appl. No.: 16/455,553

(22) Filed: Jun. 27, 2019

(51) Int. Cl.
*H04L 9/00* (2022.01)
*H04L 9/40* (2022.01)

(52) U.S. Cl.
CPC ...... *H04L 63/1433* (2013.01); *H04L 63/1416* (2013.01); *H04L 63/20* (2013.01)

(58) Field of Classification Search
CPC .. H04L 63/1433; H04L 63/1416; H04L 63/20
USPC .......................................................... 726/25
See application file for complete search history.

(56) References Cited

U.S. PATENT DOCUMENTS

| | | | |
|---|---|---|---|
| 8,127,358 B1* | 2/2012 | Lee | G06F 21/56 726/24 |
| 8,412,945 B2 | 4/2013 | Sweet et al. | |
| 8,713,633 B2 | 4/2014 | Thomas | |
| 8,850,512 B2 | 9/2014 | Price et al. | |
| 9,104,859 B1* | 8/2015 | Banerjee | G06F 21/554 |
| 2015/0135316 A1* | 5/2015 | Tock | G06F 21/56 726/23 |
| 2018/0027006 A1* | 1/2018 | Zimmermann | H04L 63/0245 726/11 |
| 2018/0219891 A1* | 8/2018 | Jain | H04L 63/1425 |
| 2019/0005236 A1* | 1/2019 | Singh | G06F 21/56 |
| 2019/0021005 A1* | 1/2019 | Stan | H04L 67/12 |
| 2020/0412764 A1* | 12/2020 | May | H04L 41/0246 |

\* cited by examiner

*Primary Examiner* — Christopher J Brown
(74) *Attorney, Agent, or Firm* — Maschoff Brennan

(57) ABSTRACT

A testing computer system communicates with a cloud computing platform coupled to one or more target computer systems. The testing computer system receives a list of target computer systems from the cloud computing platform, generates respective test payloads for a set of the target systems, and sends the test payloads to the set of target systems. Each respective test payload is useable by its respective target system to perform a security scan of the target system and send test results to the testing computer system and includes instructions that cause the test payloads to be deleted after the security scan is performed. The testing computer system receives test results generated by the set of target systems and evaluates the test results to determine whether any of the set of target systems is implicated in a security breach.

18 Claims, 6 Drawing Sheets

COMPUTER SYSTEM SECURITY SCAN

BACKGROUND

Technical Field

This disclosure relates generally to performing security scans of computer systems.

Description of the Related Art

Computer systems are frequently attacked by malicious actors seeking to compromise the computer systems to steal information, monitor activities on the computer systems without permission, or gain control of the computer system. Security scans are performed to detect evidence of attacks on computer systems and identify computer systems that have been compromised. Any computer system that is connected to the Internet or any wide area network, either directly or indirectly through another computer system, is potentially at risk.

SUMMARY

The present disclosure concerns performing security scans on target computer systems that are coupled to a cloud computing platform. In some embodiments, a testing computer system receives a list of target computer systems from the cloud computing platform and generates respective test payloads for a set of the target systems that the testing computer sends to the cloud computing platform for forwarding to the set of target systems. In various embodiments, the test payloads are useable by the target systems to perform a security scan of the target system and send test results to the testing computer system and include instructions that cause the test payloads to be deleted after the security scan is performed. The testing computer system is configured to receive test result generated by the set of target systems and evaluate the test results to determine whether any of the set of target systems is implicated in a security breach.

Figure 1:
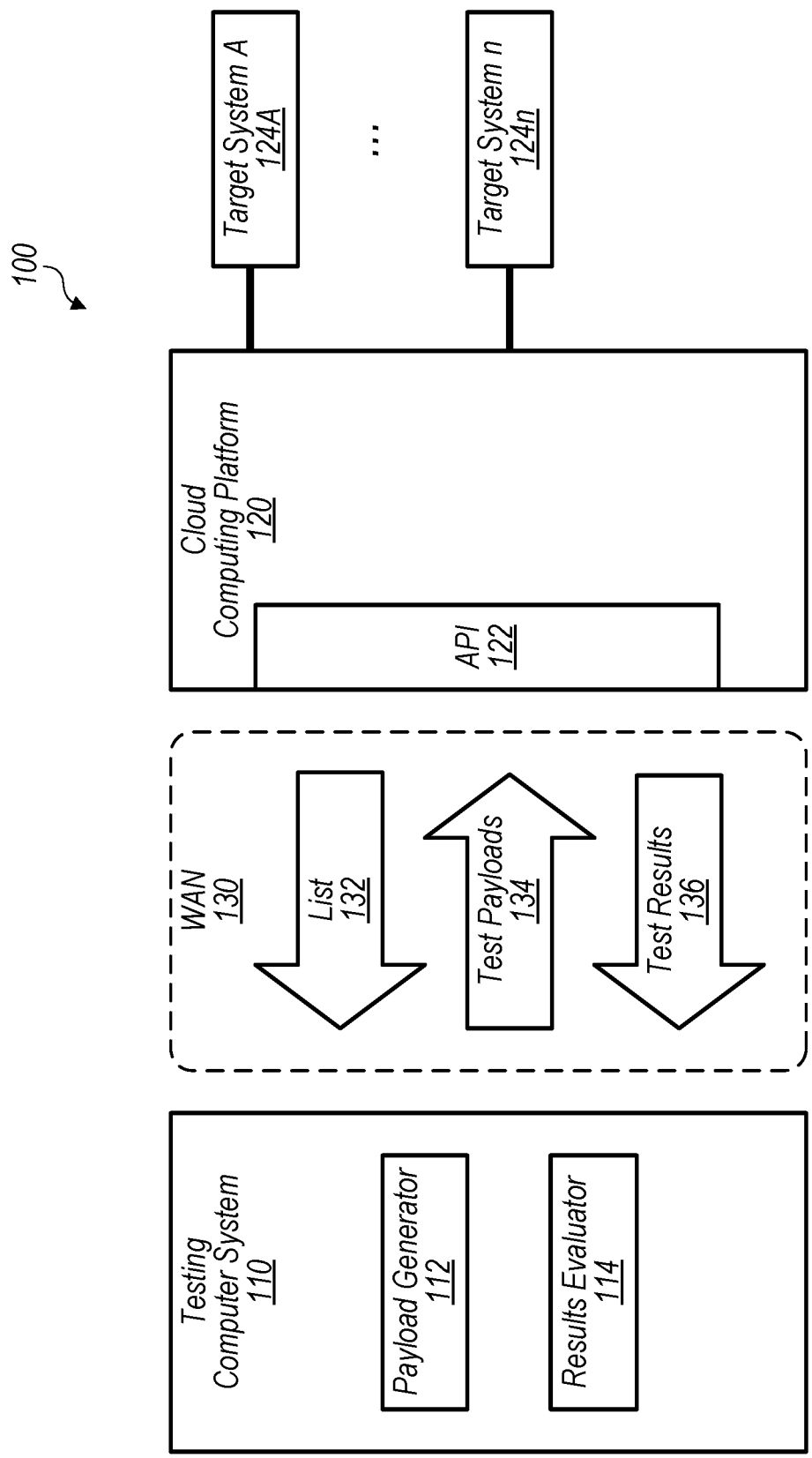
FIG. 1 is a block diagram illustrating an embodiment of a computer system configured to facilitate security scans of target systems in accordance with various embodiments.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "computer system configured to send test payloads" is intended to cover, for example, a computer system has circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, references to "first" and "second" target systems would not imply an ordering between the two unless otherwise stated.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

As used herein, the word "module" refers to structure that stores or executes a set of operations. A module refers to hardware that implements the set of operations, or a memory storing the set of instructions such that, when executed by one or more processors of a computer system, cause the computer system to perform the set of operations. A module may thus include an application-specific integrated circuit implementing the instructions, a memory storing the instructions and one or more processors executing said instructions, or a combination of both.

DETAILED DESCRIPTION

Referring now to FIG. 1, a block diagram illustrating a computer system including a testing computer system 110, a cloud computing platform 120, and one or more target systems 124 is depicted.

In various embodiments, testing computer system 110 includes a payload generator 112 and a results evaluator 114 and communicates with cloud computing platform 120 over a wide area network (WAN) 130. Testing computer system 110 can be implemented by any of number of computer systems (e.g., testing computer system 110 can be a single computer or server, one or more dedicated computer systems including multiple computer systems, or implemented with a cloud computing system). In various embodiments, testing computer system 110 communicates with WAN 130 using one or more wired and/or wireless communications mediums. In various embodiments, testing computer system 110 is configured to determine a list of target systems 124 coupled to the cloud computing platform 120 (e.g., using list 132), generate respective test payloads 134 with payload generator 112 for a set of the target systems 124 (i.e., one or more target systems on list 132) and to send the test payloads 134 to the cloud computing platform 120 for forwarding to the set of target systems 124. As discussed herein, the test payloads 134 are useable by respective target systems 124 to perform a security scan of the respective target systems 124 and send test results 136 to the testing computer system 110. In various embodiments, the test payloads also include instructions that cause the test payloads 134 to be deleted after the security scan is performed. In various embodiments, testing computer system 120 is configured to receive and evaluate test results 136 to determine whether any of the set of target systems 124 is implicated in a security breach. Testing computer system 110, payload generator 112, and results evaluator 114 are discussed in further detail herein with reference to FIG. 2.

In various embodiments, cloud computing platform 120 is any of a number of cloud-based computing platforms (e.g. Amazon Web Services®, Microsoft Azure®, Google® Cloud). In various instances, such cloud computing platform 120 is a commercially available, pay-as-you-go platform that enables users to provision and use one or more In various embodiments, application programming interface (API) 122 is s a set of subroutine definitions and communication protocols that define methods of communication between cloud computing platform 120 and computer systems coupled to WAN 130. Using API 122, testing computer system 110 is able to send and receive messages containing information and/or commands to cloud computing platform 120 including but not limited to list 132, test payloads 134, and test results 136 in various embodiments.

In various embodiments, cloud computing platform 120 is coupled to one or more target systems 124 (e.g., target systems 124A-n). In these embodiments, target systems 124 are able to communicate with cloud computing platform 120 (e.g., via HTTP). As discussed herein in reference to FIG. 3 in various embodiments, target systems 124 are implemented within cloud computing platform 120 and/or on one or more remote computer systems. In either instance, because the various target systems 124 are able to communicate with the cloud computing platform 120 these target systems 124 are referred to herein as being "coupled to" cloud computing platform 120. Thus, being "coupled to" cloud computing platform 120 includes (a) being coupled by communications channel between cloud computing platform 120 and a remote target system 124, or (b) being coupled by a communications channel within cloud computing platform 120 for target systems 124 implemented by cloud computing platform 120. In various embodiments, target computer systems 124 include but are not limited to databases, user devices such as laptops or workstations, web servers, etc. Target systems 124 are configured to run a security scan upon receiving respective test payloads 134 from cloud computing platform 120, generate results of the security scan, and send the test results 136 to cloud computing platform 120 for forwarding to testing computer system 110. In some embodiments, especially with regard to target systems 124 that are remote from cloud computing platform 120, these target systems 124 are configured to run a security scan upon receiving respective test payloads 134 from cloud computing platform 120, generate results of the security scan, and send the test results 136 to testing computer system 110 directly (i.e., not via cloud computing platform 120).

WAN 130 is one or more wired and/or wireless networks via which testing computer system 110 and cloud computing platform 120 are configured to communicate (e.g., messages including list 132, test payloads 134, test results 136). In various embodiments, WAN 130 includes the Internet. Each device that is coupled to WAN 130 has a publicly accessible address (e.g., a public IP address, an Internet IP) useable to differentiate each device from the other devices coupled to WAN 130. As discussed herein, the various target systems 124 are not directly coupled to WAN 130 and do not have publicly accessible address. Instead, the various target systems 124 have private addresses (e.g., private IP addresses, local IP addresses) to facilitate communicates via one or more local networks, but such private addresses are not exposed to WAN 130. In various embodiments, when a device (e.g., a target system 124) without a publicly accessible address receives or sends information via WAN 130 via a message, a device (e.g., a router) translates the message through a publicly accessible address, which is useable to communicate the message with other publicly accessible addresses and eventually to other local networks. Thus, various target systems 124 have access to WAN 130, but indirectly (e.g., though a router).

However, because private addresses are not visible on WAN 130, such architecture prevents testing computer system 110 from identifying target systems 124 that do not have publicly accessible addresses. Accordingly, testing computer system 110 is unable to determine a list of all of the target systems 124 that sit behind the publicly accessible address(es) used by cloud computing platform 120. In various embodiments, testing computer system 110 requests list 132 from cloud computing platform 120. In various embodiments, list 132 includes indications of a plurality of target systems 124 as well as indications of hardware, software, and/or settings of the target systems 124 that testing computer system 110 is configured to use to determine test payloads 134 for a set of the target systems 124 as discussed herein. After testing computer system 110 sends the test payloads 134 to cloud computing platform 120, cloud computing platform 120 forwards the test payloads 134 to their respective target systems 124 who perform security scans and generate test results 136. Cloud computing platform 120 sends test results 136 to testing computer system 110, which evaluates the test results using results evaluator 114. The test payloads 134 also include instruction to delete the test payloads 134 after the security scan. In other embodiments, test payloads 134 do not include instructions to delete the test payloads 134, but are scripts that are not retained in memory on target systems 124 or cloud computing platform 120 after the scripts have been performed. In such embodiments, the test payloads 134 are overwritten when the target systems 124 load other operations (e.g., operations for programs installed on target system 124) into memory. In embodiments, because these test payloads 134 are only delivered and executed on demand, long term performance side effects (e.g., reduced cloud performance and higher hosting costs due to overprovisioning or slower processing times) are reduced or eliminated.

Figure 2:
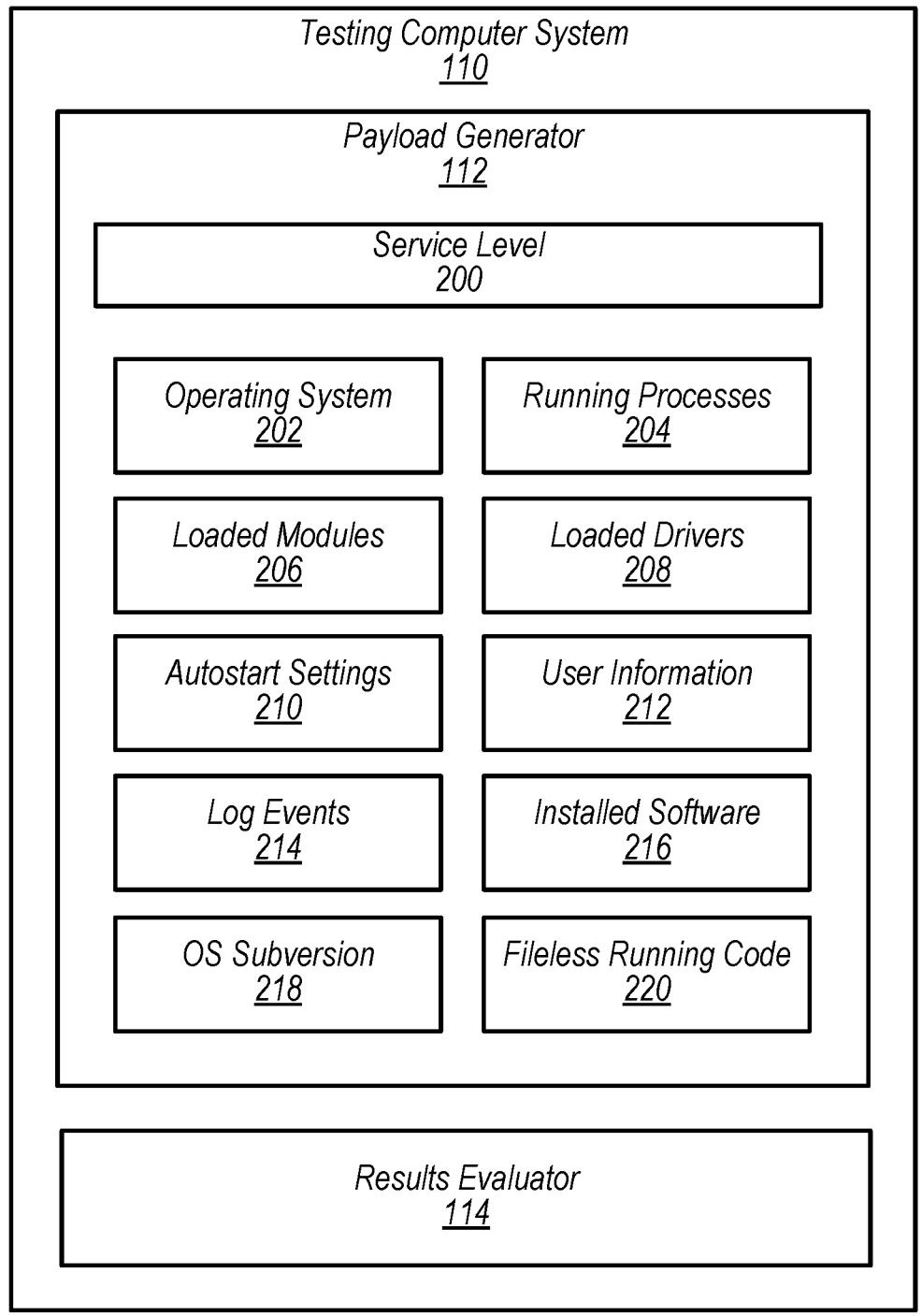
FIG. 2 is an expanded block diagram of the testing computer system 110 of FIG. 1 in accordance with various embodiments.

Referring now to FIG. 2, an expanded block diagram of testing computer system 110 is depicted. Testing computer system 110 includes payload generator 112 and results evaluator 114. Testing computer system 110 is configured to communicate with cloud computing platform 120 to receive list 132, determine a set of target systems 124 to test, generate and send test payloads 134, and receive and evaluate results 136.

In various embodiments, payload generator 112 includes a plurality of modules operable to generate test payloads 134 including but not limited to service level module 200, operating system (OS) module 202, running processes module 204, loaded modules module 206, loaded drivers module 208, autostart settings module 210, user information module 212, log events module 214, installed software module 216, OS subversion module 218, and fileless running code module 220. In various embodiments, payload generator 112 includes all of these modules, but in other embodiments payload generator 112 includes additional modules (e.g., modules that add additional tests to the test payloads 134) or fewer modules.

Service level module 200 is operable to determine the set of target systems 124 to test. In some embodiments, the set includes each of the target systems 124 on list 132. In other embodiments, the size of the set of target systems 124 to test is limited by a service level (e.g., a lower level of service in which only a subset of target systems 124 are tested). In other embodiments, service level module 200 receives an indication (e.g., scan request 310 discussed in connection to FIG. 3) and focus the test on a subset of target systems 124 based on the indication (e.g., scan request 310 indicates that database target systems 124 should be tested but user workstation target systems 124 should not be tested, scan request 310 indicates that a potential security breach in certain target systems 124).

The various modules 202-220 are executable to add operations to the test payloads 134 to gather details regarding the running state of a target system 124, without the requirement to install heavy software or rely on other tooling such as logs or existing security apparati. In various embodiments, because the hardware, software, and settings of various target systems 124 vary, test payloads 134 for different types of target systems 124 also vary. List 132 includes indications of a plurality of target systems 124 as well as indications of hardware, software, and/or settings of the target systems 124. Payload generator 112 and the various modules 202-220, therefore, are operative to assemble different test payloads 134 for different configurations of target systems 124 based on the indications in list 132. For example in various embodiments, different a first test payloads 134 are generated for target systems 124 having a first OS and second test payloads 134 are generated for target systems 124 having a second, different OS. In another example in various embodiments, first test payloads 134 are generated for target systems 124 implemented within cloud computing platform 120 and second test payloads are generated for target systems 124 implemented on computer systems that are remote from cloud computing platform 120.

In various embodiments, OS module 202 is executable to include operations for the security scan caused by target systems 124 executing test payloads 134 that: determine version and architecture information about the OS running on the target systems 124 and, in some embodiments, also determine patch information about the OS running on the target systems 124.

In various embodiments, running processes module 204 is executable to include operations for the security scan caused by target systems 124 executing test payloads 134 that: determine what programs and processes are being executed on target systems 124, and in embodiments, collect binary metadata along with associated user accounts and process identification data.

In various embodiments, loaded modules module 206 is executable to include operations for the security scan caused by target systems 124 executing test payloads 134 that: determine loadable modules running on target system 124. Modern OSs share common code/functionality through loadable modules (e.g., generally .dll files on Microsoft Windows®, .so files on Linux®, and .dylib files on macOS®). Malicious applications can inject modules into running processes to change their behavior and subvert detection mechanisms. In various embodiments, the security scan collects binary metadata as well as what process(es) they are loaded in.

In various embodiments, loaded drivers module 208 is executable to include operations for the security scan caused by target systems 124 executing test payloads 134 that: obtains a list of low level drivers in use by the OS. Drivers generally provide access to hardware but also serve to provide additional functionality to the OS itself. Malware can attempt to install a malicious driver to subvert detection mechanisms that take place in non-kernel managed space, called user space/user land. In various embodiments, the security scan collects binary metadata for this list of drivers.

In various embodiments, autostart settings module 210 is executable to include operations for the security scan caused by target systems 124 executing test payloads 134 that: obtains the list of events during various boot or login events. These are grouped together under the term "autostarts" and executed automatically and without user interaction (automatically). For example, on Microsoft Windows® autostarts can include things like scheduled tasks, login triggers, items listed in various registry locations known as "run keys", along with many others. As another example, on Unix®-like systems this can include things like cron jobs, user profile scripts, systemd or upstart services, etc. In various embodiments, the security scan enumerates all of these various locations and lists the entries found along with binary metadata about the files themselves.

In various embodiments, user information module 212 is executable to include operations for the security scan caused by target systems 124 executing test payloads 134 that: obtains information about user accounts on target system 124. In various embodiments, this includes but is not limited to (a) collecting information about the local users that have accessed the system, (b) collecting information about network users that have accessed the system, and/or (c) collecting information about access times and/or account privileges of users of local users or network users.

In various embodiments, log events module 214 is executable to include operations for the security scan caused by target systems 124 executing test payloads 134 that: check logs from one or more built-in logging features of the OS of the target system 124 or any other program running on target system 124. In various embodiments, security scan collects, for example, time and detail information for user login events and/or potentially malicious events such as log or audit clearing events.

In various embodiments, installed software module 216 is executable to include operations for the security scan caused by target systems 124 executing test payloads 134 that: gathers list of what software is installed on target system 124. In various instances, this information is useful for auditing what the user(s) of target system 124 have done. In other instances, this can also identify if known malware or software vulnerable to exploit is present within a target system 124.

In various embodiments, OS subversion module 218 is executable to include operations for the security scan caused by target systems 124 executing test payloads 134 that: checks for malicious methods intended to alter the way the OS of target system 124 functions. For example, a technique known as "hooking" a code execution path involves modifying the way internal code functions, often to mask activity or provide incorrect results to user applications. In various embodiments, the security scan looks at how important functions are supposed to be executed, and inspects current running processes to ascertain whether or not that is how they are functioning on target system 124. In such instances, discrepancies are reported as results 136.

In various embodiments, fileless running code module 220 is executable to include operations for the security scan caused by target systems 124 executing test payloads 134 that: checks for "fileless execution" of malware. Many types of malware attempt to hide their execution using a variety of techniques known as "fileless execution." In various instances, this can be a script that is run without saving the file to disk or a full executable loaded into the memory of another running process and then executed. If a security scan's detection mechanism relies on being able to inspect files saved to a disk, such techniques might not be detected by the security scan. Operations to check for fileless execution enable the security scan to inspect the memory area of running applications on the target system 124 and identifies code in execution that should not be there. In various embodiments, these findings are reported in the test results 136 as well as the binary data of the code in question.

Results evaluator 114 is operable to interpret test results 136 and determine whether a particular target system is implicated in a security breach. In some embodiments, results evaluator 114 is deterministic and looks for specific behaviors or results (e.g., the name of known malware installed on target computer 124, the presence of known malicious modules on target system 124). Additionally or alternatively, in some embodiments, results evaluator 114 is statistical and looks for trends in test results 136 that are probabilistically associated with compromised systems. For example, results evaluator 114 includes a model and uses machine learning techniques to determine whether test results 136 from a particular target system 124 indicate that the particular target system 124 has been compromised. In either or both such embodiments, if such specific behaviors or results are detected and/or comparison to a model indicates that a target system 124 is compromised, then results evaluator 114 reports that the target system 124 may be compromised and identifies the area(s) of concern.

Figure 3:
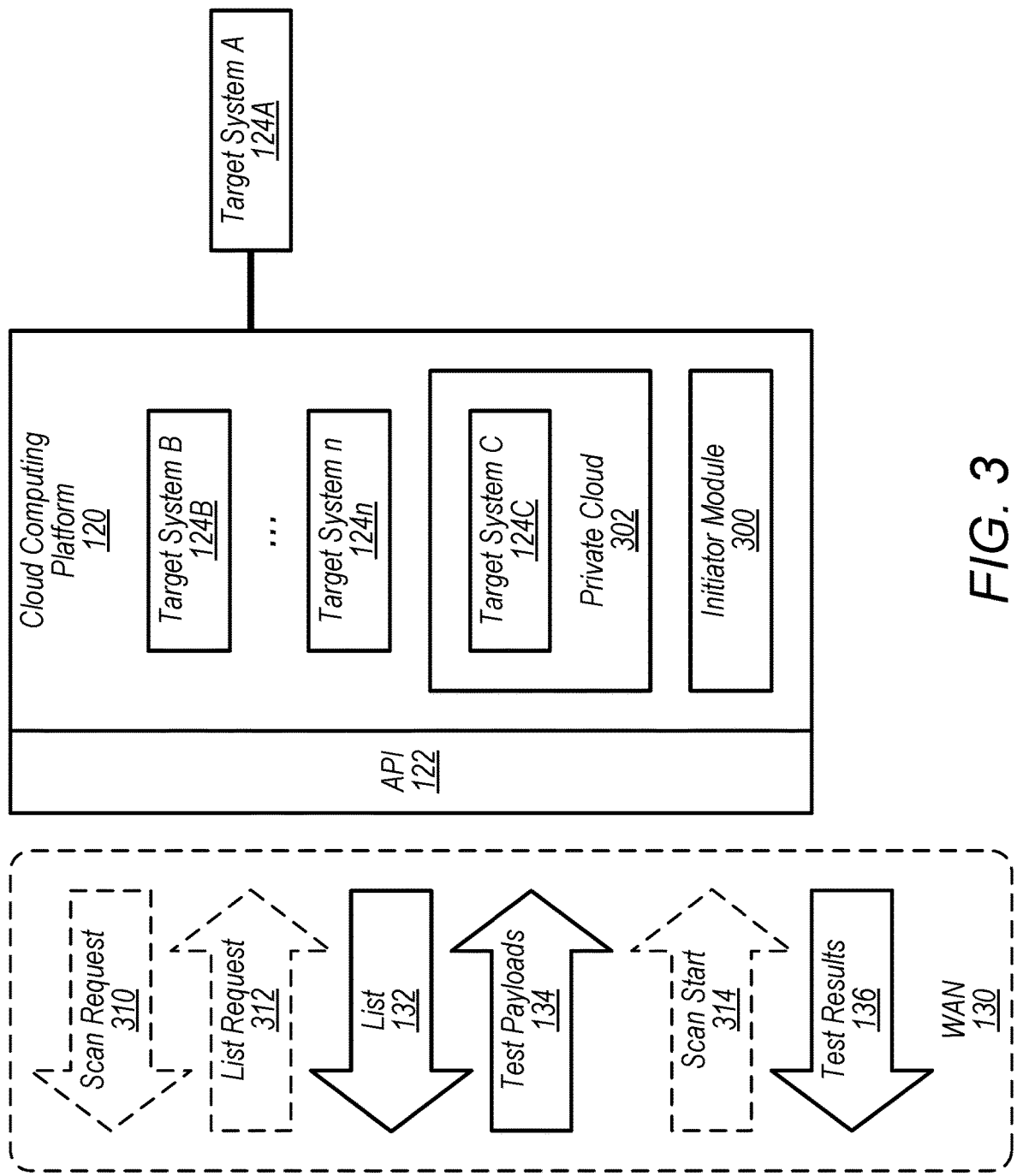
FIG. 3 is an expanded block diagram of the cloud computing platform 120 of FIG. 1 in accordance with various embodiments.

Referring now to FIG. 3, an expanded block diagram of cloud computing platform 120 is depicted. As in FIG. 1, cloud computing platform 120 includes API 122. The cloud computing platform 120 depicted in FIG. 3 additionally includes an initiator module 300 and plurality of target systems 124 implemented by cloud computing platform 120 including a target system 124C implemented with private cloud 302. In various embodiments, cloud computing platform 120 also sends or receives a scan request 310, a list request message 312, and/or a scan start message 314 in addition to list 132, test payloads 134, and test results 136 discussed herein. In various embodiments, cloud computing platform 120 does not include all of the elements depicted in FIG. 3. For example, cloud computing platform 120 does not include a private cloud or initiator module 300 in various embodiments. As another example, cloud computing platform 120 might send a single message combining scan request 310 and list 132 without receiving list request 312.

In various embodiments, initiator module 300 is a module is installed on cloud computing platform 120 and monitors cloud computing platform 120 and/or one or more target system 124 to determine whether to initiate a security scan. In some embodiments, initiator module 300 receives an indication that a security breach is suspected to have occurred at one or more target systems 124. In such embodiments, initiator module 300 in turn sends scan request message 312 to testing computer system 110 to initiate the security scans as discussed herein. For example, IT personnel associated with the entity operating cloud platform 120 could receive an indication that a security breach has occurred by seeing that confidential information from a target system 124 (e.g., user account information) has been posted on the internet, and IP personnel, send an indication to initiator module 300 (e.g., via a GUI), and initiator module 300 sends scan request message 310. Additionally or alternatively, initiator module 300 monitors for the provisioning of new target systems 124 or receives an indication from cloud computing platform 120 that new target systems 124 have been provisioned. In some of such embodiments, initiator module 300 sends scan request 310 to initiate a security scan of target systems 124 to form a baseline for subsequent security scans (i.e., a brand new target system 124 is unlikely to have been attacked already, so the test results 136 from the new target system 124 could be used to compare with future scans). Additionally or alternatively, initiator module 300 causes the security scan to be initiated periodically (e.g., every week, every month, every two months, etc.).

In the embodiment shown in FIG. 3, cloud computing platform 120 is coupled to target system A 124A and implements target systems 124B, 124C, and 124n. In various embodiments, target system 124A is implemented on a third computer system that is remote from cloud computing platform 120. Thus, in various embodiments target system 124A is implemented on a separate cloud computing platform 120 or in separate computer system (e.g., a desktop computer, a laptop, a server, or a private data center). In some embodiments, target system 124A is located on the premises of the entity that is utilizing the cloud computing platform. Target systems 124B, 12C, through 124n are implemented by cloud computing platform 120.

In various embodiments, cloud computing platform 120 implements on or more target systems 124 (e.g., target system 124C shown in FIG. 3) in a private cloud 302. In various embodiments, private cloud 302 is a logically isolated section of cloud computing platform 120 where resources can be launched in a virtual network that is defined by an entity using cloud computing platform 120. In various embodiments, the virtual networking environment of private could 302 in controllable down to the selection of IP address ranges, the creation of subnets, and the configuration of route tables and network gateways. As discussed herein, in some embodiments, some target systems 124 (e.g., target systems 124B-124n shown in FIG. 3) have publicly accessible address on WAN 130 that can be accessed via WAN 130 while other target systems (e.g., target system 124A and target system 124C shown in FIG. 3) do not have publicly accessible addresses on WAN 130.

Accordingly, an entity (e.g., an online storefront, an online service provider) utilizing cloud computing platform 120 to perform tasks (e.g., the tasks associated with the online store or online service) is able to use cloud computing platform 120 to coordinate the performance of these tasks using various target systems 124 that are implemented within cloud computing platform 120 or remote from cloud computing platform 120. In one non-limiting example, an entity providing online media streaming services can user cloud computing platform 120 to provision a public-facing subnet (e.g., a website that serves the streaming media) with target systems 124B-n such that users can access the website over WAN 130. In this example, target system 124C is a database storing media and is implemented within private cloud 302 that is not directly accessible via WAN 130, but is in communication with the public-facing subnet such that media from the database can be streamed to users via the website. In this example, target system 124A is a development server located in a private datacenter belonging to the entity that is used by developers to test new features for the website. In this example, because all of target systems 124A, 124B, 124C, and 124n are in communication with (or implemented by) cloud computing platform 120, each of these target systems 124 can be scanned as discussed herein without implementing persistent scanning software on the target system 124 even though target systems 124A and 124C are not directly accessible via WAN 130.

In various embodiments, testing computer system 110 sends list request 312 to cloud computing platform 120. In such embodiments, list request 312 requests that cloud computing platform 120 provide list 132, which includes indications of a plurality of target systems 124 as well as indications of hardware, software, and/or settings of the target systems 124 in various embodiments as discussed herein. In some embodiments, list requests 312 requests a list 132 of all target computer systems 124 in communication with (or implemented by) cloud computing platform 120 that are operated for a particular entity (e.g., an online storefront, an online service provider). In other embodiments, list request 312 requests a list 132 for a subset of target computer systems 124 in communication with (or implemented by) cloud computing platform 120 that are operated for a particular entity. For example, list request 312 may request a list 132 of all target computer systems 124 implemented by target computer system 124. In various embodiments, list request 312 is received by cloud computing platform via API 122. In various embodiments, list request 312 is sent by testing computer system 110 in response to receiving scan request 310. In other embodiments, however, no scan request 310 is received and the security scan process discussed herein are initialized by testing computer system 110 sending list request 132.

In various embodiments, testing computer system 110 sends a scan start command 314 to cloud computing platform 120 after sending test payloads 134. In such embodiments, scan start command 314 is useable by the cloud computing platform 120 to instruct target systems 124 to start their security scans using the test payloads 134. In various embodiments, scan start command 314 is an application program interface call made to cloud computing platform 120 via API 122. In such embodiments, for example, API 122 is operable to enable computer systems remote from cloud computing platform 120 (such as testing computer system 110) to command cloud computing platform 120 and various target systems 124 in communication with (or implemented by) cloud computing platform 120 to execute any of a number of operations including the various operations in test payloads 134. In various embodiments, scan start command 314 is a separate message, but in other embodiments scan start command 314 is incorporated with test payload 134 such that target systems receive their respective test payloads 134 and execute the security scans without further command.

Figure 4:
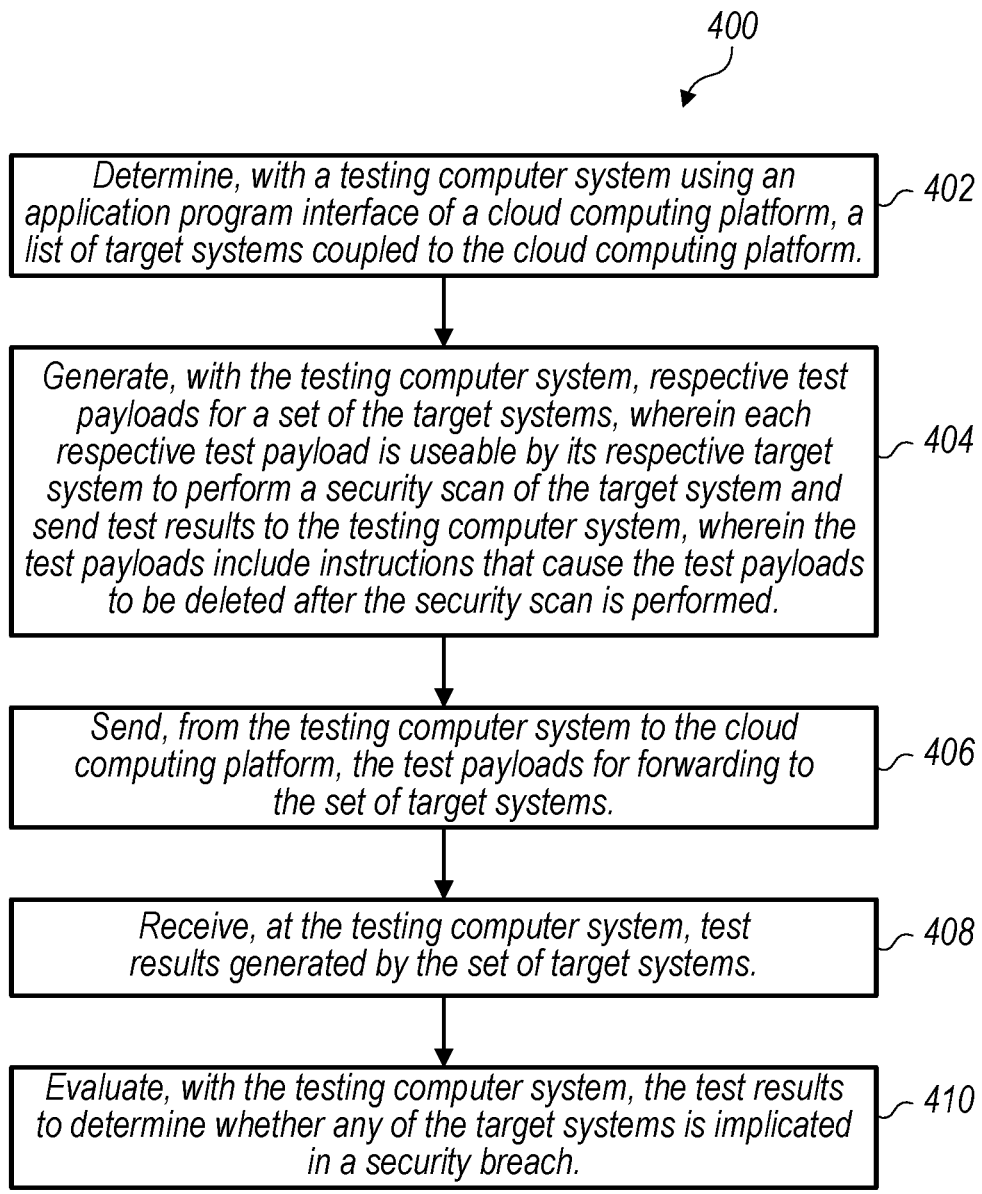
FIG. 4 is a flowchart illustrating an embodiment of a target system scanning method in accordance with various embodiments.

FIG. 4 and various flowcharts representing various disclosed methods implemented with the components depicted in FIG. 1. Referring now to FIG. 4, a flowchart illustrating an embodiment of a target system scanning method 400 is shown. In the embodiment shown in FIG. 4, the various actions associated with method 400 are implemented by testing computer system 110 in communication with cloud computing platform 120 and target systems 124.

At block 402, testing computer system 110 determines, using API 122 of cloud computing platform 120, a list 132 of target systems 124 coupled to the cloud computing platform 120. At block 404, testing computer system 110 generates respective test payloads 134 for a set of the target systems 124. Each respective test payload 134 is useable by its respective target system 124 to perform a security scan of the target system 124 and send test results 136 to the testing computer system 110. Each test payload 134 includes instructions that cause the test payloads 134 to be deleted after the security scan is performed. At block 406, testing computer system 110 sends test payloads 134 to cloud computing platform 120 for forwarding to the set of target systems 124. At block 408, testing computer system 110 receives test results 136. At block 410, testing computer system 110 evaluates test results 136 to determine whether any of target systems 124 is implicated in a security breach.

Figure 5:
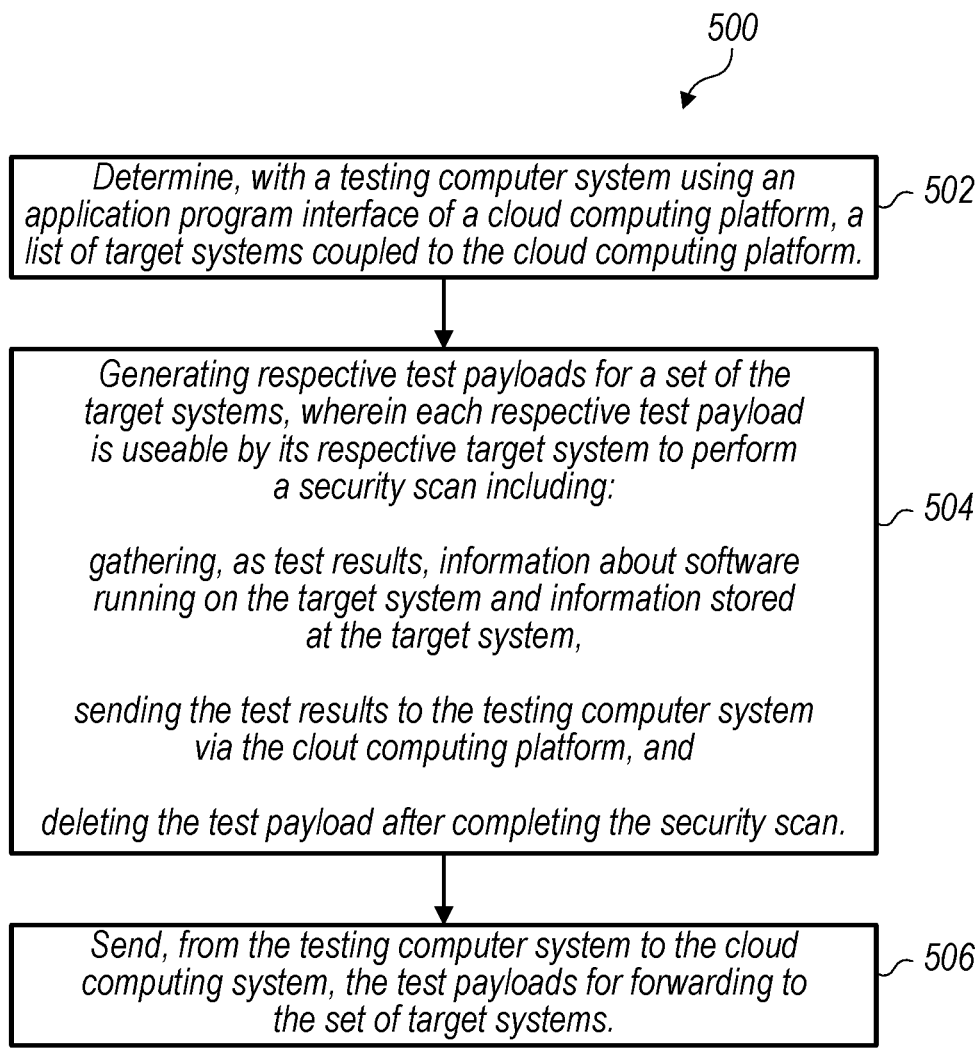
FIG. 5 is a flowchart illustrating an embodiment of a target system scanning method method in accordance with various embodiments.

Referring now to FIG. 5, a flowchart illustrating an embodiment of a target system scanning method 500 is shown. In the embodiment shown in FIG. 5, the various actions associated with method 500 are implemented by testing computer system 110 in communication with cloud computing platform 120 and target systems 124.

At block 502, testing computer system 110 determines, using an API 122 of cloud computing platform 120, a list 132 of target systems 124 coupled to the cloud computing platform 120. At block 504, testing computer system 110 generates respective test payloads 134 for a set of the target systems 124. Each respective test payload 134 is useable by its respective target system 124 to perform a security scan including: gathering, as test results 136, information about software running on the target system 124 and information stored at the target system 124, sending test results 136 to testing computer system 110, and deleting test payload 134 after completing the security scan. At block 506, testing computer system 110 sends test payloads 134 to cloud computing platform 120 for forwarding to the set of target systems 124.

Exemplary Computer System

Figure 6:
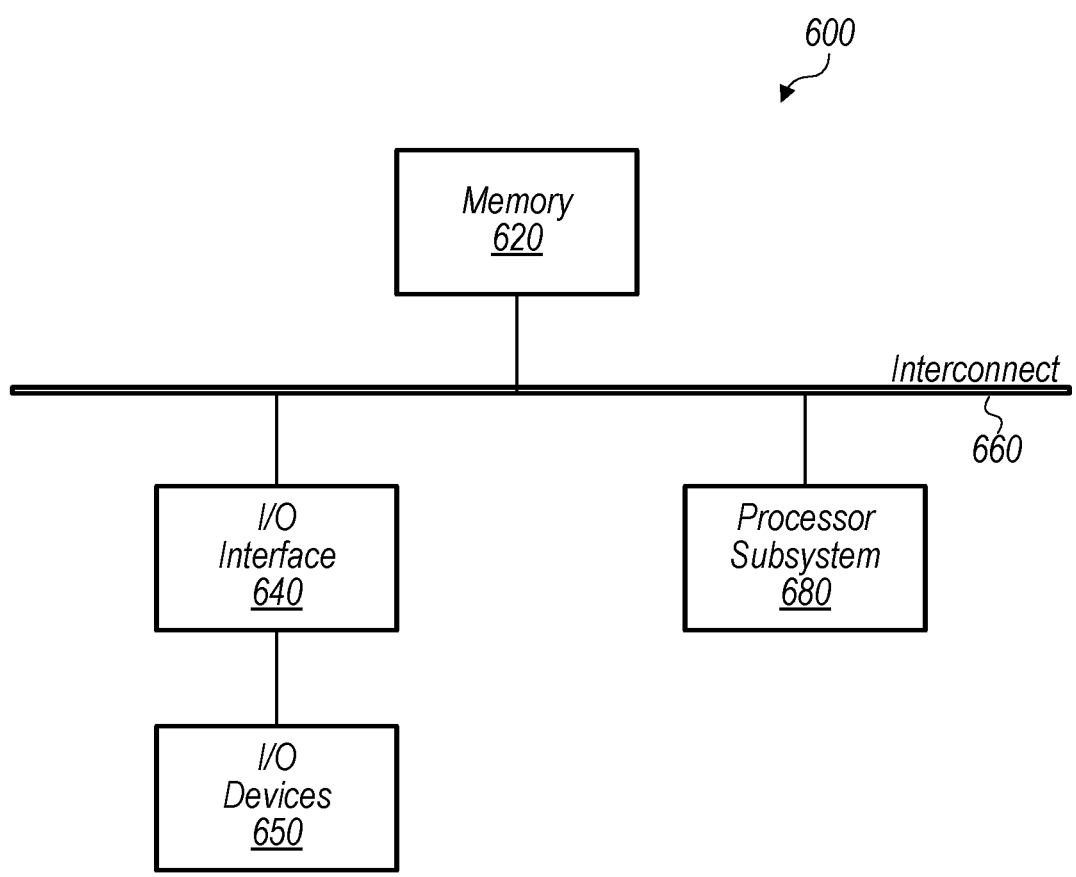
FIG. 6 is a block diagram of an exemplary computer system, which may implement the various components of FIGS. 1 and 2.

Turning now to FIG. 6, a block diagram of an exemplary computer system 600, which may implement the various components of computer system 100 (e.g., testing computer system 110, cloud computing platform 120, target systems 124) is depicted. Computer system 600 includes a processor subsystem 680 that is coupled to a system memory 620 and I/O interfaces(s) 640 via an interconnect 660 (e.g., a system bus). I/O interface(s) 640 is coupled to one or more I/O devices 650. Computer system 600 may be any of various types of devices, including, but not limited to, a server system, personal computer system, desktop computer, laptop or notebook computer, mainframe computer system, tablet computer, handheld computer, workstation, network computer, a consumer device such as a mobile phone, music player, or personal data assistant (PDA). Although a single computer system 600 is shown in FIG. 6 for convenience, system 600 may also be implemented as two or more computer systems operating together.

Processor subsystem 680 may include one or more processors or processing units. In various embodiments of computer system 600, multiple instances of processor subsystem 680 may be coupled to interconnect 660. In various embodiments, processor subsystem 680 (or each processor unit within 680) may contain a cache or other form of on-board memory.

System memory 620 is usable to store program instructions executable by processor subsystem 680 to cause system 600 perform various operations described herein. System memory 620 may be implemented using different physical memory media, such as hard disk storage, floppy disk storage, removable disk storage, flash memory, random access memory (RAM-SRAM, EDO RAM, SDRAM, DDR SDRAM, RAMBUS RAM, etc.), read only memory (PROM, EEPROM, etc.), and so on. Memory in computer system 600 is not limited to primary storage such as memory 620. Rather, computer system 600 may also include other forms of storage such as cache memory in processor subsystem 680 and secondary storage on I/O Devices 650 (e.g., a hard drive, storage array, etc.). In some embodiments, these other forms of storage may also store program instructions executable by processor subsystem 680.

I/O interfaces 640 may be any of various types of interfaces configured to couple to and communicate with other devices, according to various embodiments. In one embodiment, I/O interface 640 is a bridge chip (e.g., Southbridge) from a front-side to one or more back-side buses. I/O interfaces 640 may be coupled to one or more I/O devices 650 via one or more corresponding buses or other interfaces. Examples of I/O devices 650 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 600 is coupled to a network via a network interface device 650 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. A method for performing an endpoint security scan on target systems via a cloud computing platform, the method comprising:

requesting via a wide area network connection, by a testing computer system from one or more server systems of a cloud computing platform, using an application program interface of the cloud computing platform, a list of multiple target systems coupled to the cloud computing platform;

receiving, by the testing computer system from the one or more server systems, the list of multiple target systems, wherein the list includes attributes of respective target systems including: hardware included in the target systems, one or more settings of the target systems, and software installed on the target systems;

generating, by the testing computer system based on the attributes and the received list, respective test payloads for a set of the target systems, wherein each respective test payload is useable by its respective target system to perform a security scan of the target system and send test results to the testing computer system, wherein the test payloads include instructions that cause the test payloads to be deleted after the security scan is performed;

sending, from the testing computer system to the cloud computing platform, the test payloads for forwarding to the set of target systems;

receiving, at the testing computer system, test results generated by the set of target systems; and evaluating, with the testing computer system, the test results to determine whether any of the set of target systems is implicated in a security breach.

2. The method of claim 1, further comprising:

sending, from the testing computer system to the cloud computing platform, a security scan start command useable by the cloud computing platform, via an application program interface call, to instruct the target systems to start their security scan.

3. The method of claim 1, wherein the target systems have only indirect access to the wide area network via the cloud computing platform.

4. The method of claim 1, wherein the security scan includes determining processes running on the target system, checking one or more event logs, and checking for fileless code running on the target system.

5. The method of claim 1, wherein one or more of the test payloads are configured based on the attributes for the target system indicate to perform a security scan that inspects a memory area of running applications on the target system.

6. The method of claim 1, wherein one or more of the target systems is implemented by the cloud computing platform and wherein one or more of the target systems is implemented on a third computer system that is remote from the cloud computing platform.

7. The method of claim 1, the method further comprising:
prior to requesting the list of target systems, receiving an indication that a security breach is suspected to have occurred at one of more target systems coupled to the cloud computing platform.

8. The method of claim 1 wherein the generating, sending, and evaluating are performed in response to a provisioning of one or more target systems.

9. A non-transitory computer-readable medium storing instructions that when executed by a testing computer system cause the testing computer system to perform operations comprising:
requesting via a wide area network connection, from one or more server systems of a cloud computing platform, using the cloud computing platform, a list of multiple target systems coupled to the cloud computing platform;
receiving, from the one or more server systems, the list of multiple target systems, wherein the list includes attributes of respective target systems including: hardware included in the target systems, one or more settings of the target systems, and software installed on the target systems;
generating, based on the attributes and the received list, respective test payloads for a set of the target systems, wherein each respective test payload is useable by its respective target system to perform a security scan of the target system and delete the test payload after completing the security scan;
sending, to the cloud computing platform, the test payloads for forwarding to the set of target systems;
receiving test results generated by the set of target systems; and
evaluating the test results to determine whether any of the set of target systems is implicated in a security breach.

10. The computer-readable medium of claim 9, wherein the security scan includes determining modules and drivers loaded on the target system, determining user profile information stored on the target system, and determining software installed on the target system.

11. The computer-readable medium of claim 9, wherein one or more of the test payloads are configured based on the attributes for the target system to perform a security scan that inspects a memory area of running applications on the target system.

12. The computer-readable medium of claim 9, wherein one or more of the target systems is implemented within a private cloud of the cloud computing platform.

13. The computer-readable medium of claim 9, wherein one or more of the target systems is implemented by the cloud computing platform and wherein one or more of the target systems is implemented on a third computer system that is remote from the cloud computing platform.

14. A method comprising:
requesting via a wide area network connection, by a testing computer system from one or more server systems of a cloud computing platform, using an application program interface of the cloud computing platform, a list of multiple target systems coupled to the cloud computing platform;
receiving, by the testing computer system from the one or more server systems, the list of multiple target systems, wherein the list includes attributes of respective target systems including: hardware included in the target systems, one or more settings of the target systems, and software installed on the target systems;
generating, based on the attributes and the received list, respective test payloads for a set of the target systems, wherein each respective test payload is useable by its respective target system to perform a security scan including:
gathering, as test results, information about software running on the target system and information stored at the target system,
sending the test results to the testing computer system, and
deleting the test payload after completing the security scan; and
sending, from the testing computer system to the cloud computing system, the test payloads for forwarding to the set of target systems.

15. The method of claim 14, wherein one or more of the test payloads indicate to perform a security scan that inspects a memory area of running applications on the target system.

16. The method of claim 14, wherein one or more of the target systems is implemented by the cloud computing platform and wherein one or more of the target systems is implemented on a third computer system that is remote from the cloud computing platform.

17. The method of claim 14 further comprising:
periodically repeating the generating and sending.

18. The method of claim 14 wherein the generating and sending are performed in response to a provisioning of one or more target systems.

* * * * *